No. 615,539. Patented Dec. 6, 1898.
P. A. EMANUEL.
ELECTRIC BATTERY.
(Application filed May 17, 1898.)
(No Model.) 2 Sheets—Sheet 1.

Witnesses
Rey C. Bowen.
John H. Halt.

Inventor
P. A. Emanuel
by Wilkinson & Fisher.
Attorneys

No. 615,539. P. A. EMANUEL. Patented Dec. 6, 1898.
ELECTRIC BATTERY.
(Application filed May 17, 1898.)
(No Model.) 2 Sheets—Sheet 2.
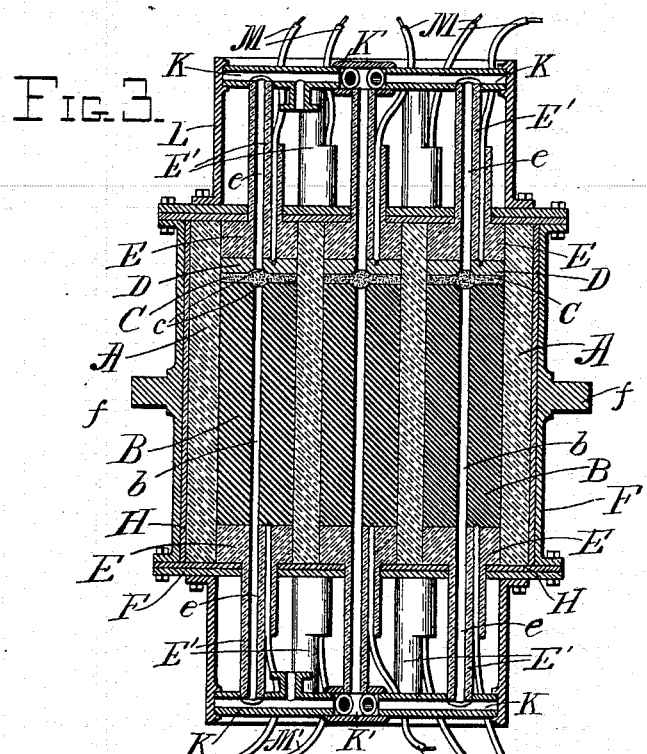
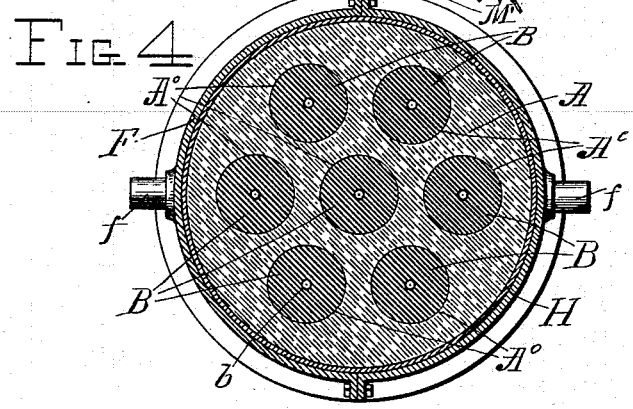
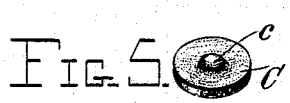
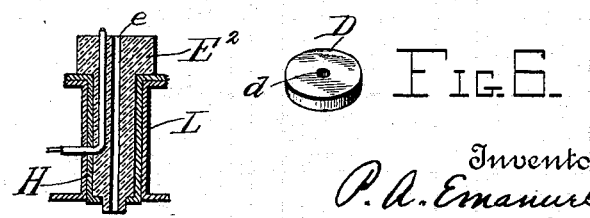
Witnesses
Inventor
P. A. Emanuel
by Wilkinson & Fisher
Attorneys

UNITED STATES PATENT OFFICE.

PHILIP ALBERT EMANUEL, OF AIKEN, SOUTH CAROLINA.

ELECTRIC BATTERY.

SPECIFICATION forming part of Letters Patent No. 615,539, dated December 6, 1898.

Application filed May 17, 1898. Serial No. 680,984. (No model.)

*To all whom it may concern:*

Be it known that I, PHILIP ALBERT EMANUEL, a citizen of the United States, residing at Aiken, in the county of Aiken and State of South Carolina, have invented certain new and useful Improvements in Electric Batteries; and I do hereby declare the following to be a full, clear, and exact description of the invention, such as will enable others skilled in the art to which it appertains to make and use the same.

My invention relates to improvements in electric batteries generally, and more especially in improvements upon galvanic and hydro-electric batteries.

According to my invention I so improve these batteries and combine their action as to produce a battery of high efficiency, yielding a high and constant electromotive force, of compact structure, and capable of being made at small cost.

My invention possesses many advantageous features over other batteries hitherto known in the art, all of which will be hereinafter more particularly described and claimed.

In order to more fully describe my said invention, reference will be had to the accompanying drawings, in which—

Figure 1:
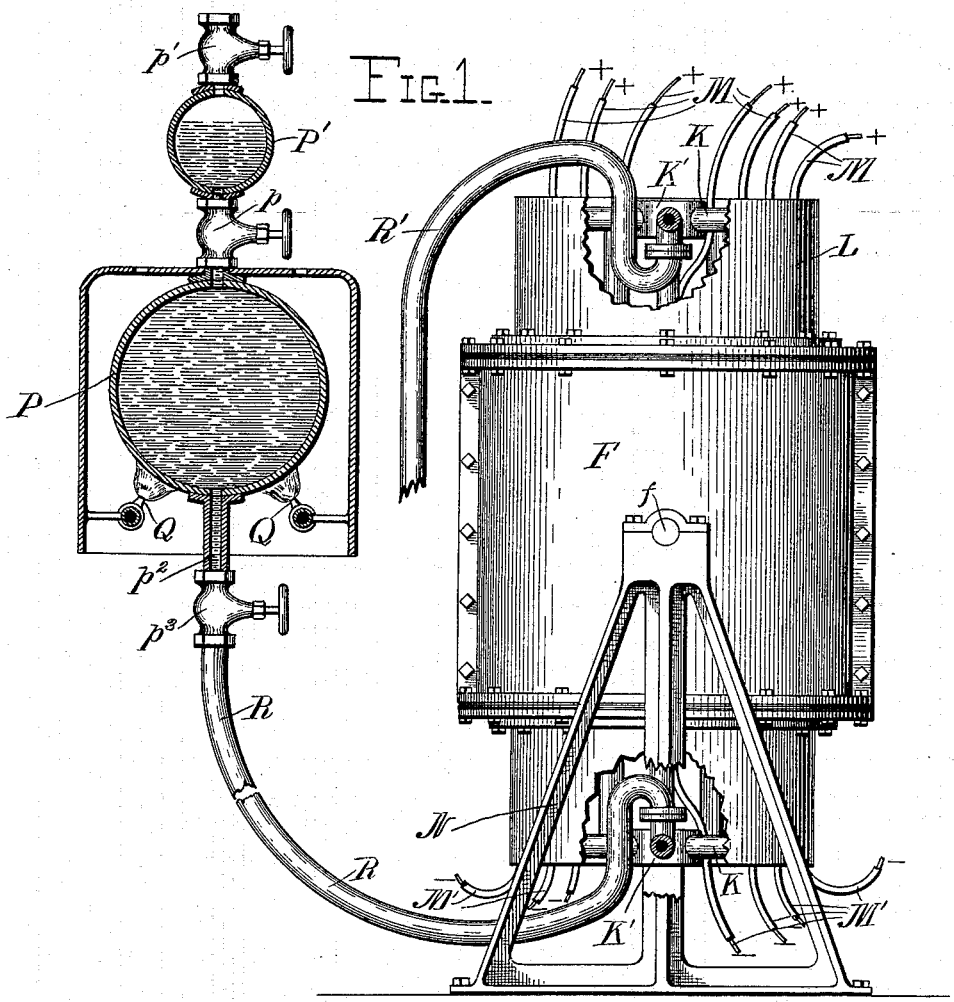
Figure 2:
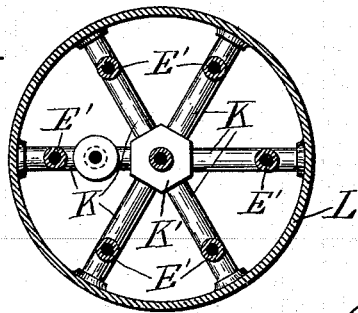

Figure 1 represents my improved battery in side elevation, with parts broken away to moer clearly show the structure. Fig. 2 is a detail sectional view of the distributing-pipes. Fig. 3 is a vertical central sectional view of my improved battery unmounted. Fig. 4 is a horizontal sectional view of the same. Fig. 5 is a perspective view of one of the porous disks. Fig. 6 is a similar view of the negative element, and Fig. 7 is a detail sectional view of a form of insulating-stopper employed with the battery.

Similar letters refer to similar parts throughout the several views.

A represents a cylinder or receptacle of non-conducting material—such as glazed clay or earthenware, glass, hard rubber, vulcanized fiber, wood, &c.—and while shown cylindrical in cross-section the receptacle A is by no means necessarily of such a form, as its cross-section may be square, octagonal, hexagonal, or, indeed, any other convenient form, as will hereinafter more readily appear.

The receptacle A is provided with a plurality of chambers $A^0$, which pass longitudinally through the said receptacle, as shown. In the chambers $A^0$ are placed the elements, which may be of any of the well-known kinds now used with galvanic batteries, but for the sake of simplicity and clearness they will be shown and described as zinc and copper and the electrolyte as copper sulfate.

The zinc elements B are each provided with a small central longitudinal passage $b$ and are adapted to fit snugly into the chambers $A^0$ as cartridges into the chambers of a revolver. In engagement with one end of each of the zinc elements are the small disks or diaphragms C, composed of some porous substance, such as unglazed earthenware. These disks C are provided with central enlargements $c$, one on each face, the said enlargements being adapted to register with the passages $b$ of the zinc element. These disks, being porous, are unglazed, as stated, except where the enlargements $c$ occur. At these points the disks are glazed. The disks C fit snugly into the chambers $A^0$, and, as before stated, are in direct engagement with one end of the zinc elements, all of which is most clearly shown in Fig. 3.

The copper elements D are made in the form of disks with a central aperture $d$. These copper or negative elements are placed on the opposite side of the porous disks C from the zinc elements and in direct engagement with the former, as shown. In this position the apertures $d$ of the copper disks coincide with the enlargements $c$ of the porous disks. The elements being thus placed within the chambers $A^0$ the ends of the latter are closed by non-conducting stoppers E. These stoppers are non-conductors of electricity and may be composed of any of the materials of which the receptacle A is composed—that is, glazed earthenware, glass, hard rubber, vulcanized fiber, &c. The stoppers E are each provided with a neck $E'$, through which, as well as through the heads of the stoppers, extend the longitudinal passages $e$. When the stoppers are inserted in each end of the chambers $A^0$, they are held in engagement with the elements, so that their passages $e$ and the passages through the elements register with each other and form what would be a continuous passage from stopper to stopper were it not for the porous disks. These passages, though, are very small, thereby allowing only a small quantity of the electrolyte to pass into the battery at one time. The object of having the passages restricted by the porous disks will be hereinafter explained.

The receptacle A, containing the elements, porous disks, and stoppers, is inclosed in a casing F of metal or other suitable material. Between this casing F and the receptacle is a packing H of asbestos, cloth, or rubber. This packing fits tightly around the stoppers and end of the battery, thus preventing any possible leakage of the electrolyte.

The necks of the stoppers E extend through the ends of the casing F and at their ends are connected with the pipes K, which radiate from a union K', the pipes being made, preferably, of metal, though wood, glazed earthenware, hard rubber, or other suitable material may be used. The said pipes K are supported in a suitable frame L, which is secured to the casing of the battery, as shown. These radiating pipes K form the inflow and outflow pipes for the "fluid" or electrolyte and, as will be seen, are in direct communication with the passage which passes through the elements. The terminals of the battery are formed by the two sets of conductors M and M', which pass through the stoppers, as shown, and connect, respectively, with the positive and negative elements. The casing F is provided at each side with trunnions $f$, by which the battery is supported in a suitable frame N. Being thus supported, the battery is capable of being inverted or supported in any angular position at will. The electrolyte or exciting fluid is contained within a receiver or boiler P, which is provided with a dome P', the latter communicating with the receiver through a valve $p$. The dome P' is also provided with an inlet-valve $p'$.

In order to heat the electrolyte in the receiver P, the object of which will presently occur, any convenient means may be employed. In the accompanying drawings this means of heating consists of arranging gas-jets Q beneath the receiver; but these gas-jets only indicate a source of heat and may be replaced by a coal, wood, or other furnace.

The receiver P is connected through its outlet $p^2$ and valve $p^3$ to the radiating inlet-pipes K by the flexible piping R. Thus it will be seen that a passage for the electrolyte is afforded from the receiver P through the pipe R, the radiating-pipes K, the passages through the stoppers and electrodes, through the outflow radiating-pipes at the other end of the battery, and out through the pipe R'. Other than being retarded by the porous disks C it will be seen that the electrolyte has an unobstructed passage from the receiver P to the outlet or discharge pipe R'.

The electrolyte (copper sulfate in this case) is poured into the receiver P until, if necessary, it reaches the level in the dome P', as shown. Then when the valve $p$ is open and the valve $p'$ closed heat is applied to the receiver, as described.

The liquid in the receiver becoming heated forms steam in the space above it, the pressure of which steam will tend to force the electrolyte through the valve $p^3$. When the electrolyte has become sufficiently heated, the valve $p^3$ may be opened, when the electrolyte will be forced through the valve $p^3$, pipe R, pipes K, and into the passages $e$ of the stoppers and passages of the elements. The pressure by which the liquid or electrolyte is thus forced into the battery may be obtained from the steam generated in the receptacle above the electrolyte or by placing the receiver P at a higher level than the battery or by both. Thus the electrolyte is forced under pressure through the passages $e$ of the zinc elements and against and through the porous disks and out through the copper elements. The enlargements $c$ of these porous disks C being glazed and coinciding with the passages $b$ will not allow the electrolyte to flow directly through the center of the disks, as it would do were the enlargements $c$ not glazed, but causes the electrolyte to be forced in between the lower faces of the porous disks and the upper ends of the zinc elements. The electrolyte being forced in this way is compelled to pass through the porous disk only when the latter comes in contact with the elements—that is, when the electrolyte passes through the porous disks from above the zinc elements it will emerge from the porous disk, where the latter comes in contact with the copper disk, thus insuring complete chemical action. The electrolyte being thus forced through the porous disks will enter the passages $e$ of the upper stoppers, pass into the radiating discharge-pipes, and, together with any waste products which it may contain, will be discharged through the pipe R'.

The effect of the copper sulfate acting upon the zinc and copper will be to set up an electric current which will, as is well known, flow from the zinc to the copper, which in this case is the direction in which the electrolyte is caused to flow. It will be assumed, of course, that the external circuit is completed before any chemical action at all takes place. When the battery is in action, the copper sulfate will dissolve the upper end of the zinc electrodes—that is, that portion of the zinc in contact with the porous disks—and form zinc sulfate. The free copper will be deposited upon the lower surface of the copper elements. This eating away of the zinc and building up of the copper elements on each side of the porous disks will act to gradually lower the porous disks as the chemical action continues, thus keeping the distance between the elements constant, and therefore keeping the internal resistance of the battery constant. This action will therefore produce a constant output of electricity. The copper sulfate from the boiler or receiver P being hot will greatly increase the electromotive force of the battery. Moreover the electromotive force is further increased by forcing the electrolyte through the porous disks. It has long been known that electric currents may be generated by forcing the copper sulfate through a porous diaphragm, and it has also long been known that the use of hot copper sulfate increases the electromotive force; but so far as I am aware no practical means have ever been devised whereby all of these properties of the electric current have been employed and put into practical use in combination with a galvanic battery. The terminals of the battery may be so connected as to put the several elements in series or multiple, as may be desired. It will thus be seen that not only does my improved battery permit of a great many elements being placed in a very small space and securely protected from any external damaging effects, but it also embodies the advantages of yielding a high and constant electromotive force.

Another advantage of the herein-described battery is its longevity. As only a small space is given to the electrolyte, the greater portion is given to the zinc elements, which allows them to be made quite large in proportion to the size of the battery. It will also be seen that by the herein-described invention I am enabled to convert heat energy direct into electrical energy in a practical way.

There are many other advantages possessed by my battery which will suggest themselves to any one skilled in the art.

The battery as herein shown and described is also capable of many modifications and changes, which may be made without departing from the spirit of the invention. Thus I may change the form of the stoppers E to that shown at E², Fig. 7. In this latter case the metal casing L extends completely around the neck of the stopper and between the casing and the neck of the stopper in the packing H. This arrangement protects the stopper from any liability to breakage, in addition to forming a tight joint. Again, the shapes of the electrodes and their compositions may be varied. Also cold copper sulfate may be used instead of the hot solution, though with a corresponding diminution of the electromotive force, and while my invention is capable of many other modifications

What I claim, and desire to secure by Letters Patent of the United States, is—

1. In an electric-battery cell, the combination with positive and negative elements, both having passages through them, of a porous body separating the said elements, the said porous body being impervious to a fluid where it registers with the passage through said elements, an exciting fluid or electrolyte, and means for forcing the said fluid or electrolyte through the passages in said elements and through the said porous body, substantially as described.

2. In an electric battery, the combination with the positive and negative elements, both of said elements having passages through them for an exciting fluid, of a porous body separating the said elements, the said porous body being impervious to a fluid where it registers with said passages, an exciting fluid or electrolyte, means for forcing the said fluid or electrolyte through said passages and said porous body, and means for discharging said fluid or electrolyte from said battery after it passes the said elements, substantially as described.

3. In an electric battery, the combination with the positive and negative elements, both of said elements having passages through them for an exciting fluid or electrolyte, of a porous body separating the said elements, and in contact therewith, said porous body being impervious to the flow of a fluid where it registers with the said passages, an exciting fluid or electrolyte, means for heating the same and for forcing said fluid or electrolyte in a heated state, through said passages and said porous body, and means for discharging said fluid or electrolyte from said cell after the same has passed said elements, substantially as described.

4. In an electric-battery cell, the combination of the positive and negative elements, both having passages through them for an exciting fluid, a porous body separating said elements, a casing inclosing said elements and in engagement therewith, an exciting fluid or electrolyte, means for forcing said fluid or electrolyte through said passages and porous body, and means for removing said electrolyte and its waste products from said cell, substantially as described.

5. In an electric-battery cell, the combination of the positive and negative elements, both having passages through them for an exciting fluid or electrolyte, a porous diaphragm separating said elements and in contact therewith a casing inclosing said elements and in engagement therewith, sealing-stoppers confining said elements within said casing, an exciting fluid or electrolyte, means for heating said fluid or electrolyte and passing the same in a heated state and under pressure through said passages and through said porous body, and means for removing said electrolyte or fluid and its waste products from said cell, substantially as described.

6. In an electric battery, the combination with a receptacle having a plurality of chambers therein, of positive and negative elements carried within said chambers, the said elements being provided with passages through them for an exciting fluid, porous diaphragms separating the positive and the negative elements of each couple from each other, means for retaining said elements within said chambers, a casing inclosing said receptacle, an exciting fluid or electrolyte, and means for forcing said electrolyte through said passages and said porous diaphragms, substantially as described.

7. In an electric battery, the combination with a receptacle having a plurality of chambers therein, of positive and negative elements carried within said chambers, the said elements being provided with passages through them for an exciting fluid, porous diaphragms separating the positive and the negative elements of each couple from each other within said chambers, means for retaining said elements within said chambers, a casing inclosing said receptacle, an exciting fluid or electrolyte, and means for heating the same and for forcing said fluid or electrolyte under pressure and in a heated state through said porous diaphragms and passages of said elements, substantially as described.

8. In an electric battery, the combination with a receptacle having a plurality of chambers therein, of positive and negative elements carried within said chambers, the said elements being provided with passages through them for an exciting fluid, porous diaphragms in engagement with and separating the positive from the negative elements within the said chambers, stoppers of nonconducting material provided with passages through them and adapted to be inserted in said elements, a casing inclosing the said receptacle, an exciting fluid or electrolyte, and means for forcing the same through the passages of said stoppers, the passages of said elements and through the porous diaphragms, and means for removing the said fluid or electrolyte from said battery, substantially as described.

9. In an electric battery, the combination with a receptacle having a plurality of chambers therein, of positive and negative elements carried within said chambers, the said elements being provided with passages through them for an exciting fluid, porous diaphragms in engagement with and separating the positive from the negative elements within said chambers, stoppers of non-conducting material provided with passages through them and adapted to be inserted in said chambers and outside of said elements, a casing inclosing the said receptacle, an exciting fluid or electrolyte, means for heating the same and for forcing said fluid or electrolyte in a heated state through the passages of said stoppers, through the passages of said elements and through said porous diaphragms, and means for removing said fluid or electrolyte from said battery, substantially as described.

10. In an electric battery, the combination with a receptacle having a plurality of chambers therein, of positive and negative electrodes adapted to fit tightly into said receptacles, the said elements being provided with passages through them for an exciting fluid, porous diaphragms in engagement with and separating the positive from the negative elements within the said chambers, stoppers of non-conducting material provided with passages through them and adapted to be inserted in said chambers and outside of said elements, a casing inclosing the said receptacle, an exciting fluid or electrolyte, and means for forcing the same through the passages of said stoppers and elements, and through the said porous diaphragms, and means for removing the said fluid or electrolyte from said battery, substantially as described.

11. In an electric battery, the combination with a receptacle provided with chambers extending longitudinally through the same, of positive elements of greater length than breadth provided with passages passing longitudinally through them and adapted to fit tightly within said chambers, porous diaphragms fitting tightly in said chambers and covering one end of the said positive elements, negative elements provided with passages extending through them, said elements fitting tightly into said chambers and in contact with said porous diaphragms on the opposite side thereof from said positive elements, an electrolyte or exciting fluid and means for passing said electrolyte or fluid through the passages in said elements and through such portions of said porous diaphragms as do not coincide with the passages through the said elements, and means for removing said electrolyte or fluid after the same has passed the elements, substantially as described.

12. In an electric-battery cell, the combination with the positive and negative elements, each of said elements having passages through them for an exciting fluid or electrolyte, of a porous diaphragm in engagement with the said elements and separating them one from the other, the said porous diaphragms being impervious to said fluid or electrolyte where said diaphragms coincide with said passages through said elements, an electrolyte or exciting fluid, and means for forcing the same through said passages and through said porous diaphragms, substantially as described.

13. In an electric battery, the combination with the positive and negative elements, each of said elements having passages through them for an exciting fluid or electrolyte, of porous diaphragms in engagement with the said elements and separating them one from the other, the said porous diaphragms being impervious to said fluid or electrolyte where said diaphragms coincide with said passages through said elements, an electrolyte or exciting fluid, means for heating said electrolyte or fluid and for forcing the same in a heated state through the said passages of said elements and through the said porous diaphragms, substantially as described.

14. In an electric battery, the combination with a receptacle having a plurality of chambers extending therethrough, of positive and negative elements adapted to fit into the said chambers and provided with passages through them for an electrolyte or exciting fluid, porous diaphragms fitting into said chambers and separating the positive from the negative elements, the said porous diaphragms being impervious to the fluid or electrolyte where said diaphragms coincide with said passages of said elements, an electrolyte or exciting fluid, and means for forcing the same through the said passages of said elements and through said porous diaphragms, and means for removing said fluid from said battery after it has passed said elements, substantially as described.

15. A porous diaphragm for electric-battery cells having enlargements upon each face thereof, said enlargements being impervious to the passage of fluids, substantially as described.

16. In an electric battery, the combination with a receptacle of non-conducting material provided with a plurality of chambers passing longitudinally therethrough, of positive elements of greater length than breadth provided with passages through them for an exciting fluid or electrolyte, the said elements adapted to fit tightly within said chambers, porous diaphragms in said chambers and covering one end of said positive element, negative elements carried within said chambers and located on the opposite side of said porous diaphragms from said positive elements, stoppers of non-conducting material inserted in each end of said chambers outside of said elements, the said stoppers having passages through them for the said electrolyte or fluid, a casing inclosing said receptacle, packing between said receptacle and stoppers and said casing, an electrolyte or exciting fluid and means for forcing the same through said passages and through said porous diaphragms, and means for removing said electrolyte from said battery after it has passed the elements, substantially as described.

17. In an electric battery, the combination with a receptacle provided with a plurality of chambers, of positive and negative elements carried within said chambers, a porous diaphragm separating the positive from the negative elements, an electrolyte or exciting fluid and means for passing the same through said elements and the said porous diaphragms, a casing inclosing the said receptacle, and means for pivotally supporting said battery so that it may be revolved in a vertical plane, substantially as described.

18. In an electric battery, the combination with a receptacle provided with a plurality of chambers, of an elongated element inserted in each of said chambers, each of the said elements having a longitudinal passage through them, elements of opposite polarity from the elongated elements and inserted in said chambers above each of the elongated elements, each of the said second elements being provided with passages therethrough, porous diaphragms separating the elements of opposite polarity from each other within said chambers, an electrolyte, and means for forcing the same through and in contact with the said elements and said diaphragm, substantially as described.

19. In an electric battery, the combination with an earthenware receptacle provided with a plurality of chambers, a metal casing inclosing said receptacle, an elongated zinc element inserted in each of the said chambers, each of said elements having a longitudinal passage therethrough, elements of opposite polarity from said zinc elements and in the form of disks with an opening therethrough inserted in said chambers, one above each of said zinc elements, porous diaphragms separating the said elements in each chamber from each other, means for sealing the ends of said chambers and confining said elements, an electrolyte and means for forcing the same through and in contact with the said elements and diaphragms, substantially as described.

In testimony whereof I affix my signature in presence of two witnesses.

PHILIP ALBERT EMANUEL.

Witnesses:
    A. FRANCIS HARRISON,
    W. M. JORDAN.